(12) United States Patent
Wohlgemuth et al.

(10) Patent No.: US 8,301,745 B1
(45) Date of Patent: *Oct. 30, 2012

(54) REMOTE NETWORK DEVICE MANAGEMENT

(75) Inventors: Aron Wohlgemuth, Sunnyvale, CA (US); Amit Avivi, Sunnyvale, CA (US); Yuval Cohen, Raanana, IL (US)

(73) Assignee: Marvell International Ltd., Hamilton (BM)

( * ) Notice: Subject to any disclaimer, the term of this patent is extended or adjusted under 35 U.S.C. 154(b) by 71 days.

This patent is subject to a terminal disclaimer.

(21) Appl. No.: 12/633,137

(22) Filed: Dec. 8, 2009

Related U.S. Application Data

(63) Continuation of application No. 11/090,418, filed on Mar. 25, 2005, now Pat. No. 7,644,147.

(51) Int. Cl.
  *G06F 15/173* (2006.01)
  *H04L 12/28* (2006.01)
  *H04L 12/56* (2006.01)

(52) U.S. Cl. .................................. 709/223; 370/401
(58) Field of Classification Search .................. 709/223; 370/401
See application file for complete search history.

(56) References Cited

U.S. PATENT DOCUMENTS

| | | | | |
|---|---|---|---|---|
| 5,432,907 A * | 7/1995 | Picazo et al. | ................. | 709/249 |
| 5,438,568 A * | 8/1995 | Weisser, Jr. | ................. | 370/389 |
| 5,758,256 A * | 5/1998 | Berry et al. | ................. | 455/72 |
| 5,793,976 A * | 8/1998 | Chen et al. | ................. | 709/224 |
| 6,012,151 A * | 1/2000 | Mano | ................. | 714/11 |
| 6,151,316 A * | 11/2000 | Crayford et al. | ................. | 370/356 |
| 6,157,623 A * | 12/2000 | Kerstein | ................. | 370/315 |
| 6,320,870 B1 * | 11/2001 | Thaler | ................. | 370/445 |
| 6,363,421 B2 * | 3/2002 | Barker et al. | ................. | 709/223 |
| 6,510,144 B1 * | 1/2003 | Dommety et al. | ................. | 370/328 |
| 6,529,515 B1 * | 3/2003 | Raz et al. | ................. | 370/401 |
| 6,570,884 B1 * | 5/2003 | Connery et al. | ................. | 370/419 |
| 6,601,101 B1 * | 7/2003 | Lee et al. | ................. | 709/227 |
| 6,757,725 B1 * | 6/2004 | Frantz et al. | ................. | 709/223 |
| 6,781,994 B1 * | 8/2004 | Nogami et al. | ................. | 370/395.1 |
| 6,920,106 B1 * | 7/2005 | Chou et al. | ................. | 370/229 |
| 7,110,394 B1 * | 9/2006 | Chamdani et al. | ................. | 370/355 |
| 7,343,441 B1 * | 3/2008 | Chrysanthakopoulos et al. | ................. | 710/313 |
| 7,702,717 B2 * | 4/2010 | Jackson | ................. | 709/201 |
| 2001/0052029 A1 * | 12/2001 | Harbin | ................. | 709/251 |
| 2002/0021707 A1 * | 2/2002 | Sampath et al. | ................. | 370/412 |
| 2003/0035425 A1 * | 2/2003 | Abdollahi et al. | ................. | 370/392 |
| 2003/0041134 A1 * | 2/2003 | Sugiyama et al. | ................. | 709/223 |
| 2003/0055930 A1 * | 3/2003 | Haneda | ................. | 709/223 |
| 2003/0095545 A1 * | 5/2003 | Ngai | ................. | 370/352 |
| 2003/0110344 A1 * | 6/2003 | Szczepanek et al. | ................. | 711/100 |
| 2004/0049624 A1 * | 3/2004 | Salmonsen | ................. | 710/306 |
| 2004/0081394 A1 * | 4/2004 | Biran et al. | ................. | 385/31 |
| 2004/0174892 A1 * | 9/2004 | Jeong | ................. | 370/412 |

(Continued)

OTHER PUBLICATIONS

Shah, Niraj. "Understanding Network Processors." University of California at Berkeley. Sep. 4, 2001. pp. 1-93.*

(Continued)

*Primary Examiner* — Imad Hussain

(57) ABSTRACT

An apparatus includes a network port and a switch management processor. The network port receives packets over a network, where the packets include a management packet and a trigger packet. The switch management processor executes a command in selected management packets received over the network when a trigger pattern generated based on the trigger packet matches a bit pattern stored in memory. The bit pattern is stored in the memory during a predetermined period after the management packet is received. The predetermined period is selected based on a desired security level.

20 Claims, 6 Drawing Sheets

U.S. PATENT DOCUMENTS

| | | | |
|---|---|---|---|
| 2004/0190546 A1* | 9/2004 | Jackson | 370/463 |
| 2004/0208197 A1* | 10/2004 | Viswanathan | 370/466 |
| 2005/0018665 A1* | 1/2005 | Jordan et al. | 370/388 |
| 2005/0147032 A1* | 7/2005 | Lyon et al. | 370/229 |
| 2006/0023640 A1* | 2/2006 | Chang et al. | 370/254 |
| 2006/0026552 A1* | 2/2006 | Mazzitelli et al. | 717/101 |
| 2006/0092861 A1* | 5/2006 | Corday et al. | 370/256 |
| 2006/0129731 A1* | 6/2006 | Wallace et al. | 710/301 |

OTHER PUBLICATIONS

Pfister, Gregory F.—"An Introduction to the InfiniBand Architecture"—IBM Enterprise Server Group, Server Technology and Architecture, Austin, TX, 78758, USA—Aug. 7, 2002—16 pages.

Pentakalos, Odysseas—"An Introduction to the InfiniBand Architecture"—windows 2000 Performance Guide—Feb. 4, 2002—8 pages.

* cited by examiner

REMOTE NETWORK DEVICE MANAGEMENT

CROSS-REFERENCE TO RELATED APPLICATIONS

This application is a continuation of U.S. patent application Ser. No. 11/090,418, filed Mar. 25, 2005. The disclosure of the above application is incorporated herein by reference in its entirety.

BACKGROUND

The present invention relates generally to managing network devices such as network switches. More particularly, the present invention relates to managing network devices remotely.

FIG. 1 shows a conventional network switch management system 100 comprising a network switch 102 in communication with a central processing unit (CPU) 104, and in communication with a personal computer 106 over a network 108. Network switch 102 comprises a memory 110 that can include separate memories for storing packets and the forwarding tables that control the operation of network switch 102, as well as one or more configuration registers.

Remotely managing a network device such as network switch 102 requires reading from, and writing to, a switch memory such as memory 110, for example to modify the forwarding tables stored therein. Conventional techniques for reading from, and writing to, switch memory 110 generally require a significant contribution from a local CPU such as CPU 104. For example, according to the well-known Simple Network Management Protocol (SNMP), CPU 104 is required to execute the reads and writes.

FIG. 2 shows a conventional SNMP process 200 for writing to switch memory 110. The SNMP write transaction requires that the write command received by switch 102 (step 202) be forwarded to CPU 104 for execution (step 204). CPU 104 then writes the data to switch memory 110 (step 206).

FIG. 3 shows a conventional SNMP process 300 for reading from switch memory 110. The SNMP read transaction requires that the read command received by switch 102 (step 302) be forwarded to CPU 104 for execution (step 304). CPU 104 then sends a read command to switch memory 110 (step 306), which returns the requested data to CPU 104 (step 308). CPU 104 then sends the requested data to switch 102 (step 310), which forwards the data to PC 106 (step 312).

Clearly these transactions burden CPU 104 significantly, thereby diverting CPU 104 from its normal functions, such as routing and the like.

SUMMARY

In general, in one aspect, the invention features an apparatus comprising: a memory; a plurality of ports comprising one or more network ports to send and receive data packets and to receive management packets, wherein each of the management packets comprises one or more commands, and wherein the commands comprise one or more of the group consisting of a command to read data from the memory, and a command to write data to the memory, and a central processing unit (CPU) port to transmit packets addressed to a CPU; a forwarding engine to transfer the data packets between the ports according to a forwarding table stored in the memory; a protocol unit to identify the management packets; and a management unit to execute the commands; wherein the management packets bypass the CPU port.

In some embodiments, the management unit, upon receiving one of the management packets comprising the one or more commands, stores the one or more commands in the memory, and executes the one or more commands only after one or more predetermined bits in the memory match a predetermined trigger pattern. In some embodiments, the CPU port receives a packet comprising a command to write the predetermined trigger pattern to the one or more predetermined bits in the memory; and the management unit writes the predetermined trigger pattern to the one or more predetermined bits in the memory. In some embodiments, the management unit executes the one or more commands only when the one or more predetermined bits in the memory match the predetermined trigger pattern during a predetermined interval following receiving the one of the management packets comprising the one or more commands. In some embodiments, one of the one or more network ports receives a trigger packet addressed to the CPU; wherein the forwarding engine transfers the trigger packet to the CPU port; and wherein the CPU port receives the packet comprising the command to write the predetermined trigger pattern to the one or more predetermined bits in the memory in response to the trigger packet. In some embodiments, a network switch comprises the apparatus. In some embodiments, an apparatus comprises the network switch; and a second network switch comprising the CPU; wherein the CPU transmits one or more of the management packets to the network switch.

In general, in one aspect, the invention features an apparatus comprising: means for storing data; plurality of port means comprising one or more network port means for sending and receiving data packets and for receiving management packets, wherein each of the management packets comprises one or more commands, and wherein the commands comprise one or more of the group consisting of a command to read data from the means for storing, and a command to write data to the means for storing, and central processing unit (CPU) port means for transmitting packets addressed to a CPU; forwarding engine means for transferring the data packets between the port means according to a forwarding table stored in the means for storing; protocol means for identifying the management packets; and management means for executing the commands; wherein the management packets bypass the CPU port means.

In some embodiments, the management means, upon receiving one of the management packets comprising the one or more commands, stores the one or more commands in the means for storing, and executes the one or more commands only after one or more predetermined bits in the means for storing match a predetermined trigger pattern. In some embodiments, the CPU port means receives a packet comprising a command to write the predetermined trigger pattern to the one or more predetermined bits in the means for storing; and wherein the management means writes the predetermined trigger pattern to the one or more predetermined bits in the means for storing. In some embodiments, the management means executes the one or more commands only when the one or more predetermined bits in the means for storing match the predetermined trigger pattern during a predetermined interval following receiving the one of the management packets comprising the one or more commands. In some embodiments, one of the one or more network port means receives a trigger packet addressed to the CPU; wherein the forwarding engine means transfers the trigger packet to the CPU port mean; and wherein the CPU port means receives the packet comprising the command to write the predetermined trigger pattern to the one or more predetermined bits in the means for storing in response to the trigger packet. In some embodiments, a network switch comprising the apparatus. In some embodiments, an apparatus comprises: the network switch; and a second network switch comprising the CPU; wherein the CPU transmits one or more of the management packets to the network switch.

In general, in one aspect, the invention features a method for an apparatus comprising a memory and a plurality of ports comprising one or more network ports and a central processing unit (CPU) port, the method comprising: sending and receiving data packets on the network ports; transferring the data packets between the ports according to a forwarding table stored in the memory; receiving management packets on the network ports, wherein each of the management packets comprises one or more commands, wherein the commands comprise one or more of the group consisting of a command to read data from the memory, and a command to write data to the memory; transmitting from the CPU port packets addressed to a CPU; identifying the management packets; executing the commands; and wherein the management packets bypass the CPU port.

Some embodiments comprise, upon receiving one of the management packets comprising the one or more commands, storing the one or more commands in the memory; and executing the one or more commands only after one or more predetermined bits in the memory match a predetermined trigger pattern. Some embodiments comprise receiving a packet on the CPU port, the packet comprising a command to write the predetermined trigger pattern to the one or more predetermined bits in the memory; and writing the predetermined trigger pattern to the one or more predetermined bits in the memory. Some embodiments comprise executing the one or more commands only when the one or more predetermined bits in the memory match the predetermined trigger pattern during a predetermined interval following receiving the one of the management packets comprising the one or more commands. Some embodiments comprise receiving a trigger packet addressed to the CPU on one of the one or more network ports; transferring the trigger packet to the CPU port; and receiving on the CPU port the packet comprising the command to write the predetermined trigger pattern to the one or more predetermined bits in the memory in response to the trigger packet.

The details of one or more implementations are set forth in the accompanying drawings and the description below. Other features will be apparent from the description and drawings, and from the claims.

Figure 1:
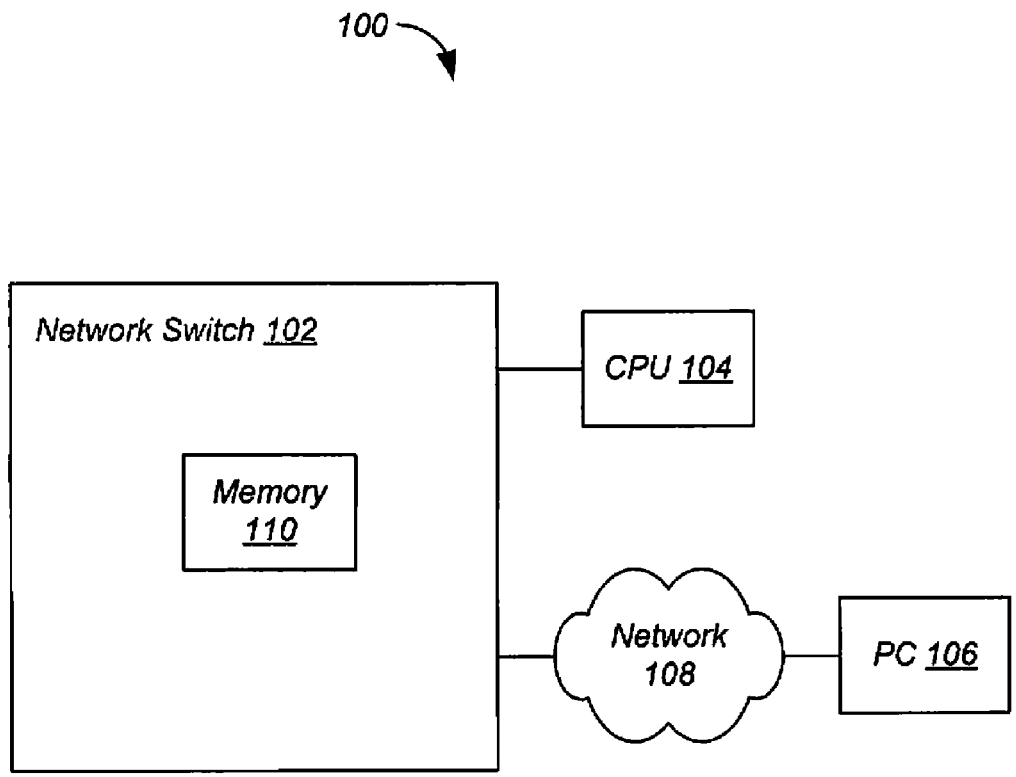
FIG. 1 shows a conventional network switch management system comprising a network switch in communication with a central processing unit and a personal computer over a network.
Figures 2, 3:
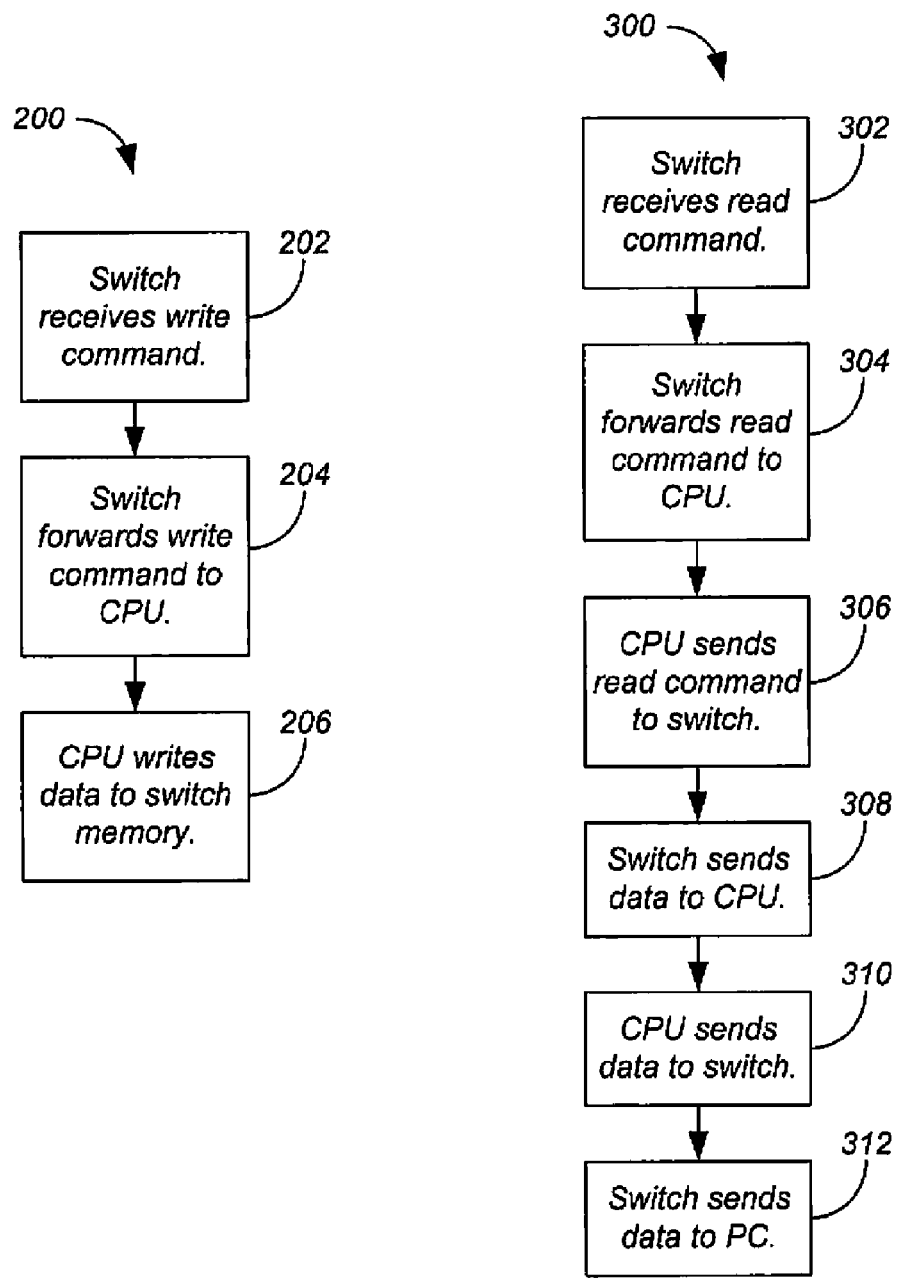
FIG. 2 shows a conventional SNMP process for writing to the switch memory of FIG. 1.
FIG. 3 shows a conventional SNMP process for reading from the switch memory of FIG. 1.

The leading digit(s) of each reference numeral used in this specification indicates the number of the drawing in which the reference numeral first appears.

DETAILED DESCRIPTION

Embodiments of the present invention provide remote management of network devices without unnecessarily burdening the local CPU. Preferably the network device to be managed comprises a protocol unit to identify management packets and a management unit to execute the commands in the management packets without sending the commands to the local CPU (that is, the management packets bypass the CPU port in the network device). Thus the local CPU is unaffected by the remote management of the network device according to these embodiments. Embodiments of the present invention have other applications as well. For example, embodiments of the present invention are useful in chip debugging.

Some embodiments provide additional security by requiring a trigger packet be sent to the CPU to initiate execution of commands previously received by the network device. The CPU then writes a predetermined trigger pattern to one or more predetermined bits in the memory of the network device. The network device, on detecting the trigger pattern, executes the commands. Some embodiments provide further security by aging the commands, for example by requiring the trigger pattern be written within a predetermined interval after receiving the commands.

Figure 4:
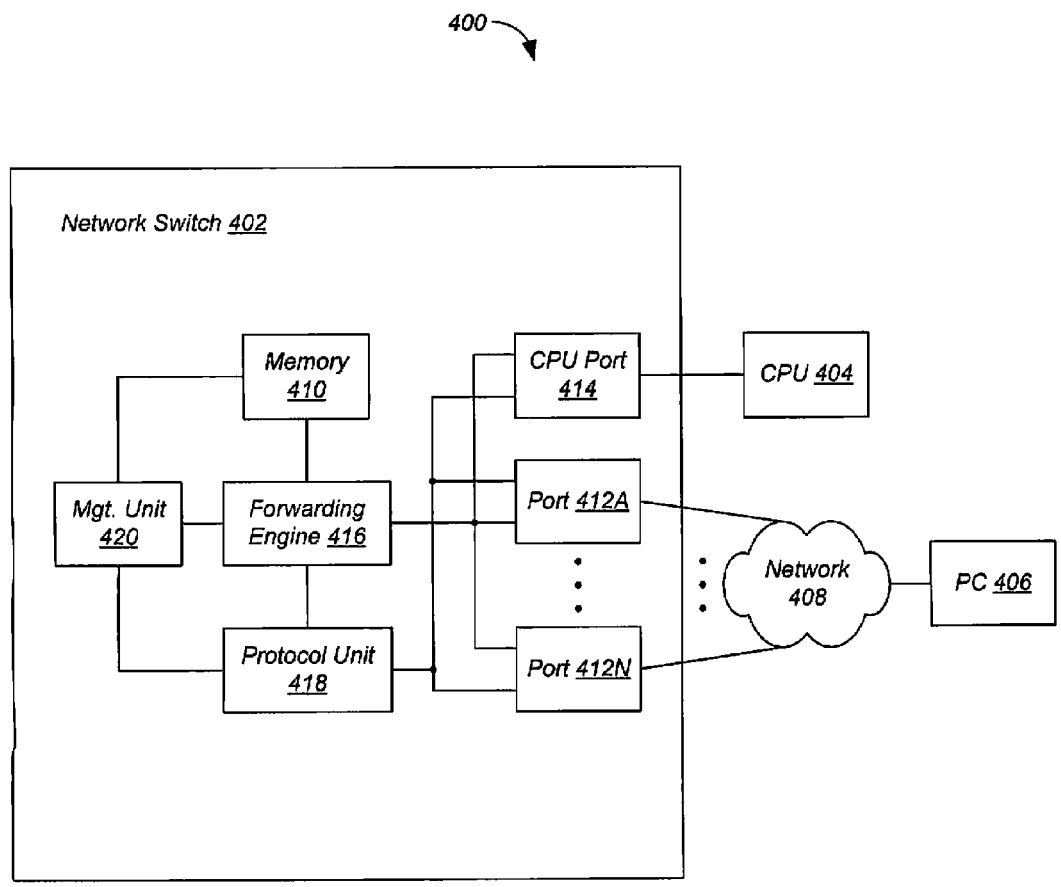
FIG. 4 shows a remote network switch management system according to a preferred embodiment of the present invention.

FIG. 4 shows a remote network switch management system 400 according to a preferred embodiment of the present invention. Although embodiments of the present invention are described with reference to remotely managing a network switch over a network, other embodiments remotely manage other sorts of network devices, and over other sorts of links, such as direct links.

Remote network switch management system 400 comprises a network switch 402 in communication with a local CPU 404, and in communication with a PC 406 over a network 408 such as a local-area network (LAN), wireless LAN, the Internet, and the like. Network switch 402 comprises a memory 410 that can include separate memories for storing packets and the forwarding tables that control the operation of network switch 402, as well as one or more configuration registers for network switch 402. Network switch 402 further comprises a plurality of ports comprising one or more network ports 412A through 412N to send and receive data packets and to receive management packets and a central processing unit (CPU) port 414 to transmit packets addressed to CPU 404, and to receive packets from CPU 404. Each of the management packets comprise one or more commands. The commands include commands to read data from memory 410 and commands to write data to memory 410, as described in detail below.

Network switch 402 further comprises a forwarding engine 416 to transfer data packets between ports 412, 414 according to a forwarding table stored in memory 410, a protocol unit 418 to identify the management packets, and a management unit 420 to execute the commands.

Figure 5:
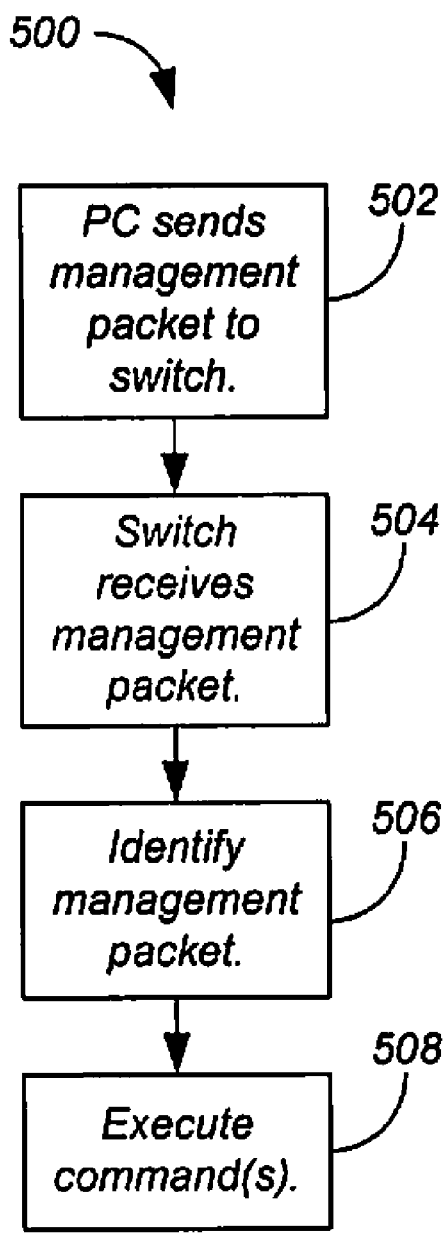
FIG. 5 shows a process for remotely managing the network switch of FIG. 4 according to a preferred embodiment.

FIG. 5 shows a process 500 for remotely managing network switch 402 according to a preferred embodiment. Personal computer 106 transmits a management packet to network switch 402 (step 502). The management packet comprises one or more commands and a management packet identifier.

The management packet traverses network 408, and arrives at network switch 402. One of network ports 112 receives the management packet (step 504). Protocol unit 418 identifies the management packet by the presence of the management packet identifier in the packet (step 506). Protocol unit 418 sends non-management packets to forwarding engine 416 to be forwarded according to well-known techniques, and sends management packets to management unit 420.

Management unit 420 executes the command(s) contained in the management packet (step 508). The commands can include commands to write data to one or more locations in memory 410, for example to modify the configuration registers or the forwarding table stored in memory 410. The commands can also include commands to read data from one or more locations in memory 410, for example to read the Management Information Base (MIB) statistics collected by network switch 402 and stored in memory 410. In the case of a read command, the requested data is packetized and returned to PC 406. Of course, other sorts of commands can be defined and implemented in this manner.

Embodiments using process 500 permit remote management of network switch 402 with no contribution from local CPU 404 at all. Other embodiments employ local CPU 404 only to provide additional security. One such embodiment is described below with reference to FIGS. 4 and 6.

Figure 6:
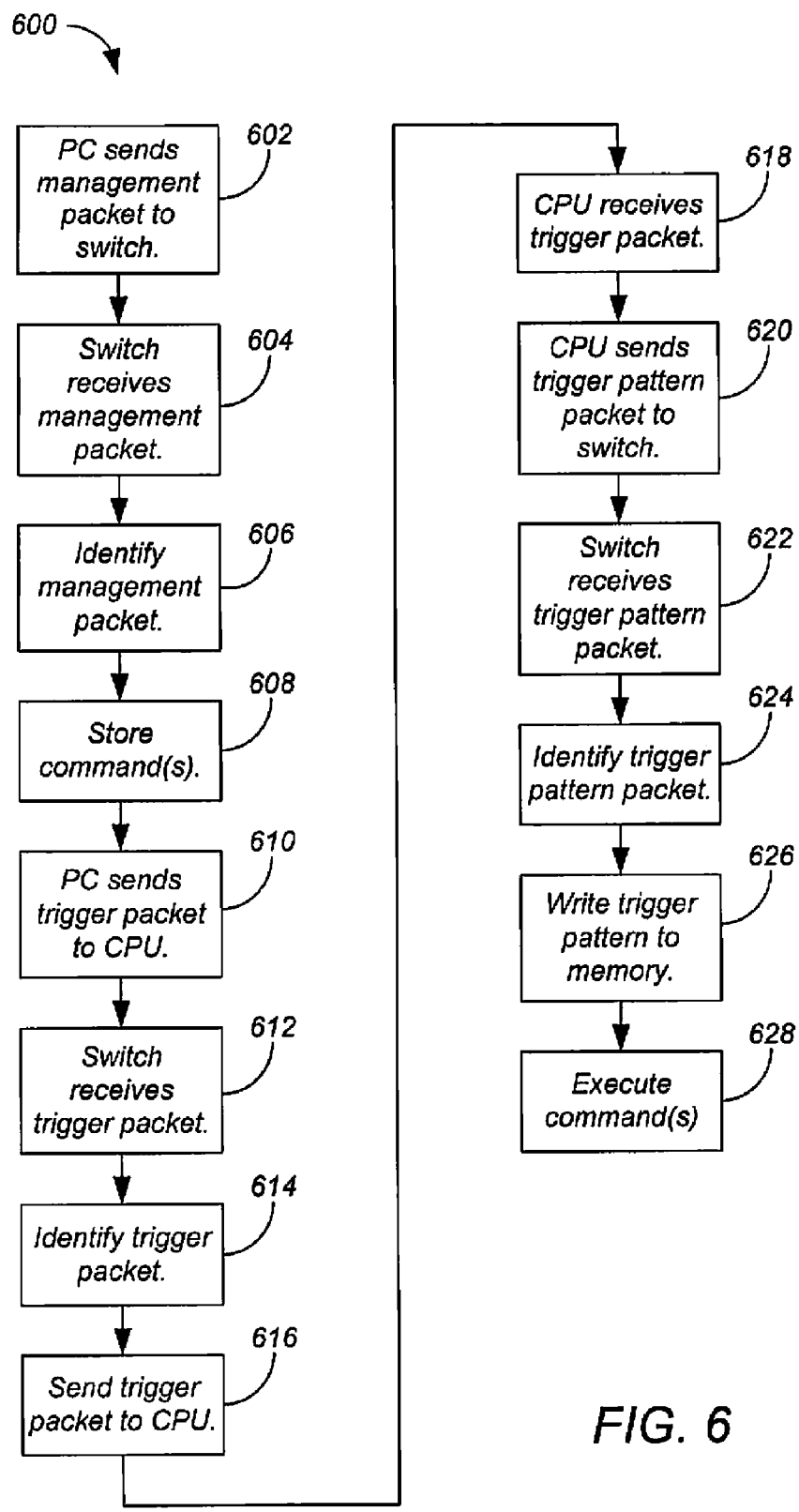
FIG. 6 shows a process for remotely managing the network switch of FIG. 4 according to a preferred embodiment providing additional security.

FIG. 6 shows a process 600 for remotely managing network switch 402 according to a preferred embodiment providing additional security. Personal computer 406 transmits a management packet to network switch 402 (step 602). The management packet comprises one or more commands and a management packet identifier.

The management packet traverses network 408, and arrives at network switch 402. One of network ports 412 receives the management packet (step 604). Protocol unit 418 identifies the management packet by the presence of the management packet identifier in the packet (step 606). Protocol unit 418 sends non-management packets to forwarding engine 416 to be forwarded according to well-known techniques, and sends management packets to management unit 420.

Management unit 420 stores the command(s) contained in the management packet in memory 410 (step 608). The commands can include the commands described above with reference to FIG. 5. To provide additional security, management unit 420 executes the stored commands only after one or more predetermined bits in memory 410 match a predetermined trigger pattern, as described in further detail below.

Personal computer 406 subsequently transmits a trigger packet to local CPU 404 (step 610). The trigger packet comprises a command to write a predetermined trigger pattern to one or more predetermined bits in memory 410. Preferably the trigger packet is a Simple Network Management Protocol (SNMP) packet, although other protocols can be used.

The trigger packet traverses network 408, and arrives at network switch 402. One of network ports 412 receives the trigger packet (step 612). Protocol unit 418 identifies the trigger packet as a non-management packet by the absence of a management packet identifier in the packet (step 614). Protocol unit 418 sends the trigger packet to forwarding engine 416, which forwards the trigger packet to CPU port 414. CPU port 414 transmits the trigger packet to CPU 404 (step 616).

CPU 404 receives the trigger packet (step 618) and, in response to the trigger packet, sends a packet to network switch 402 comprising the command to write the predetermined trigger pattern to the one or more predetermined bits in memory 410 (step 620).

CPU port 414 receives the packet from CPU 404 (step 622). Protocol unit 418 identifies the packet as a management packet by the presence of a management packet identifier in the packet (step 624), and therefore sends the packet to management unit 420. Management unit 420 writes the predetermined trigger pattern to the one or more predetermined bits in memory 410 (step 626). Preferably the trigger pattern is a single bit that is written to a predetermined bit at a predetermined address in memory 410.

Management unit 420 executes the commands stored in memory 410 only when the one or more predetermined bits in memory 410 match the predetermined trigger pattern (step 628). Preferably management unit 420 occasionally reads the predetermined bits from memory 410 and compares the bits to the predetermined trigger pattern, although other techniques can be used.

Some embodiments age the stored commands so that very old commands cannot be executed. According to these embodiments, management unit 420 executes the commands stored in memory 410 only when the one or more predetermined bits in memory 410 match the predetermined trigger pattern during a predetermined interval following receiving the management packet comprising the one or more commands. The predetermined interval is selected according to the security level desired. The commands can be disabled at the end of the predetermined interval, for example, by deleting the commands from memory 410.

Figure 7:
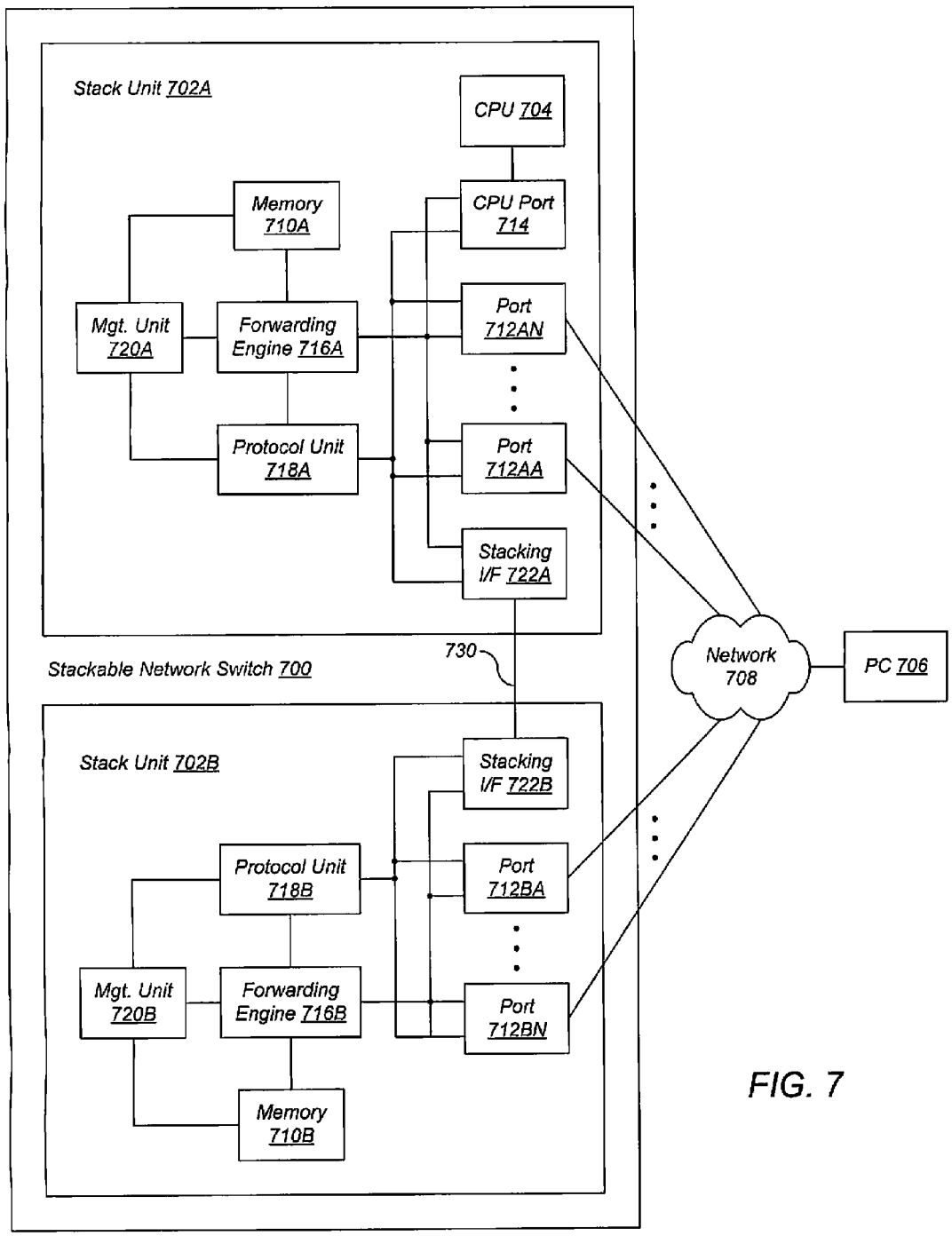
FIG. 7 shows a stackable network switch according to a preferred embodiment of the present invention.

Embodiments of the present invention can be used to implement a stackable network switch, that is, a network switch comprising one or more stack units each comprising a forwarding engine where a CPU in one of the stack units that manages all of the stack units. FIG. 7 shows a stackable network switch 700 according to a preferred embodiment of the present invention. Stackable network switch 700 comprises two stack units 702A and 702B in communication with a PC 706 over a network 708 such as a local-area network (LAN), wireless LAN, the Internet, and the like. Stack units 702A and 702B communicate with each other over a stacking link 730. Although for clarity only two stack units 702 are described, other embodiments can comprise more than two stack units 702.

Stack unit 702A comprises a memory 710A, a plurality of ports comprising one or more network ports 712AA through 712AN to send and receive data packets and to receive management packets and a CPU port 714, a CPU 704, and a stacking interface 722A. Stack unit 702A further comprises a forwarding engine 716A to transfer data packets between ports 712A and stacking interface 722A according to a forwarding table stored in memory 710A, a protocol unit 718A to identify the management packets, and a management unit 720A to execute the commands.

Stack unit 702B comprises a memory 710B, a plurality of ports comprising one or more network ports 712BA through 712BN to send and receive data packets and to receive management packets, and a stacking interface 722B. Stack unit 702B further comprises a forwarding engine 716B to transfer data packets between ports 712B and stacking interface 722B according to a forwarding table stored in memory 710B, a protocol unit 718B to identify the management packets, and a management unit 720B to execute the commands.

PC 706 can be used to manage stack unit 702A according to conventional methods. Embodiments of the present invention can be used to manage stack unit 702B as described above. For example, to manage stack unit 702B, PC 706 can send a management packet comprising one or more commands to stack unit 702B, which stores the commands in memory 710B. PC 706 can subsequently send an SNMP trigger packet to CPU 704, which causes the stored commands to be executed.

A number of implementations of the invention have been described. Nevertheless, it will be understood that various modifications may be made without departing from the spirit and scope of the invention. Accordingly, other implementations are within the scope of the following claims.

What is claimed is:

1. A network switch configured to communicate with network devices on a network, the network switch comprising:
a central processing unit (CPU) port configured to communicate with a CPU associated with the network switch;
a plurality of network ports configured to communicate with the network devices on the network, wherein at least one of the network devices comprises a network management unit for managing one or more of the network devices on the network; and
a switch management processor configured to process, without burdening the CPU, selected instructions in management packets received from the network management unit via the network ports when a trigger pattern in a trigger packet corresponds to a bit pattern stored in memory during a predetermined period after one of the management packets is received, the predetermined period being selected based on a desired security level.

2. The network switch of claim 1, wherein the CPU is configured to receive the trigger packet from the CPU port and to generate, based on the trigger packet, a packet including a write command to write the trigger pattern in the memory.

3. The network switch of claim 2, wherein the switch management processor is configured to receive the packet and to write the trigger pattern in the memory based on the write command.

4. The network switch of claim 1, further comprising:
a protocol unit to identify the management packets based on an identifier in the management packets; and
a forwarding engine to forward the management packets to the switch management processor of the network switch.

5. The network switch of claim 1, further comprising:
a protocol unit configured to identify the trigger packet as a non-management type packet based on absence of an identifier in the trigger packet; and
a forwarding engine configured to forward the trigger packet to the CPU port.

6. An apparatus comprising:
a first network switch comprising the network switch of claim 1; and
a second network switch, communicating with the first network switch via the network, comprising the network switch of claim 1 and further comprising the CPU,
wherein the network management unit transmits the management packets to the first network switch and the trigger packet to the CPU.

7. An apparatus comprising:
a network port to receive packets over a network, wherein the packets include a management packet and a trigger packet; and
a switch management processor to execute a command in selected management packets received over the network when a trigger pattern generated based on the trigger packet matches a bit pattern stored in memory,
wherein the bit pattern is stored in the memory during a predetermined period after the management packet is received, and
wherein the predetermined period is selected based on a desired security level.

8. The apparatus of claim 7, wherein the switch management processor executes the command without sending the command to a central processing unit (CPU).

9. The apparatus of claim 7 further comprising:
a protocol unit to identify the management packet based on an identifier in the management packet; and
a forwarding engine to forward the management packet to the switch management processor instead of a central processing unit (CPU).

10. The apparatus of claim 7 further comprising a central processing unit (CPU) port to communicate with a CPU, wherein:
the CPU port receives the trigger packet from the network port and transmits the trigger packet to the CPU;
the CPU generates a packet including a write command to write the trigger pattern in the memory based on the trigger packet; and
the switch management processor writes the trigger pattern in the memory within the predetermined period based on the write command.

11. The apparatus of claim 10 further comprising:
a protocol unit to identify the trigger packet as a non-management type packet based on absence of an identifier in the trigger packet; and
a forwarding engine to forward the trigger packet to the CPU port.

12. The apparatus of claim 7, wherein the command includes a write command to modify at least one of a configuration register and a forwarding table stored in the memory.

13. The apparatus of claim 7, wherein the command includes a read command to read management information base (MIB) statistics stored in the memory.

14. A network switch comprising the apparatus of claim 10.

15. A system comprising:
a first network switch comprising the apparatus of claim 10; and
a second network switch, communicating with the first network switch via the network, comprising the apparatus of claim 10 and further comprising the CPU.

16. The system of claim 15, wherein:
the first network switch further comprises a first interface;
the second network switch further comprises a second interface; and
the first network switch and the second network switch communicate via the first and second interfaces.

17. The system of claim 15, wherein the system is configured to communicate with network devices on the network, wherein at least one of the network devices comprises a network management unit for managing one or more of the network devices, and wherein the network management unit transmits the management packet to the first network switch and the trigger packet to the CPU.

18. A network switch comprising:
a plurality of ports configured to communicate with network devices on a network, wherein at least one of the network devices comprises a network management unit for managing one or more of the network devices on the network; and
a switch management processor configured to
receive a management packet from the network management unit via one of the ports, and
process a selected instruction in the management packet in response to a trigger pattern in a trigger packet matching a bit pattern stored in memory during a predetermined period after the management packet is received, the predetermined period being selected based on a desired security level.

19. The network switch of claim 18, wherein the selected instruction includes a write command to modify at least one of a configuration register and a forwarding table stored in the memory.

20. The network switch of claim 18, wherein the switch management processor executes the selected instruction without sending the selected instruction to a central processing unit (CPU) of the network switch for execution.

* * * * *